United States Patent [19]

Watson

[11] Patent Number: 5,921,228
[45] Date of Patent: Jul. 13, 1999

[54] MULTI-DIRECTIONAL, SELF-PROPELLED SAW FOR CUTTING CONCRETE SLABS

[75] Inventor: Joel W. Watson, Oconomowoc, Wis.

[73] Assignee: Mixer Systems, Inc., Pewaukee, Wis.

[21] Appl. No.: 08/864,235

[22] Filed: May 29, 1997

[51] Int. Cl.[6] .................................................. B28D 1/04
[52] U.S. Cl. ........................................ 125/13.01; 125/38
[58] Field of Search ................... 125/12, 13.01, 125/38; 299/39.1, 39.3

[56] References Cited

U.S. PATENT DOCUMENTS

| | | | |
|---|---|---|---|
| 1,230,696 | 6/1917 | Filotico | 125/13.01 |
| 2,320,743 | 6/1943 | Nilsen . | |
| 2,557,251 | 6/1951 | Baker et al. | 125/13.01 |
| 2,736,311 | 2/1956 | Coates | 125/13.01 X |
| 3,547,096 | 12/1970 | Ronzani . | |
| 3,989,230 | 11/1976 | Martens . | |
| 4,436,078 | 3/1984 | Bourke | 125/13.01 |
| 4,576,076 | 3/1986 | Pyle . | |
| 5,135,287 | 8/1992 | Karnes . | |
| 5,193,518 | 3/1993 | Moller et al. . | |
| 5,732,690 | 3/1998 | Ogyu | 125/13.01 X |
| 5,809,985 | 9/1998 | Kingsley et al. | 125/13.01 |

FOREIGN PATENT DOCUMENTS 2153742  8/1985  United Kingdom ................ 125/13.01

OTHER PUBLICATIONS

EL–1100 Hollow–Core Slab Saw, Mixer Systems, Inc., brochure #ES–S–695–2.5M.
Ultra Span Technologies "World–Wide Leader of Concrete Manufacturing Technology", An ISO–9002–04 Company.
Ultra Span, "Hollowcore Saw Product Information".

*Primary Examiner*—Timothy V. Eley
*Attorney, Agent, or Firm*—Andrus, Sceales, Starke & Sawall

[57] ABSTRACT

A saw for cutting an extruded, prestressed concrete slab having a length, a width and a thickness includes a framework assembly movable along the length of the concrete slab. A carriage system is rotatably supported from the framework assembly about a first vertical axis perpendicular to the concrete slab and is slidably mounted on the framework assembly for movement back and forth across the width of the concrete slab. A cutting arrangement including a rotary cutter is suspended from the carriage system over the concrete slab. The cutting arrangement is movable up and down along a second vertical axis substantially parallel to the first vertical axis and is also slidable along the carriage system.

20 Claims, 7 Drawing Sheets

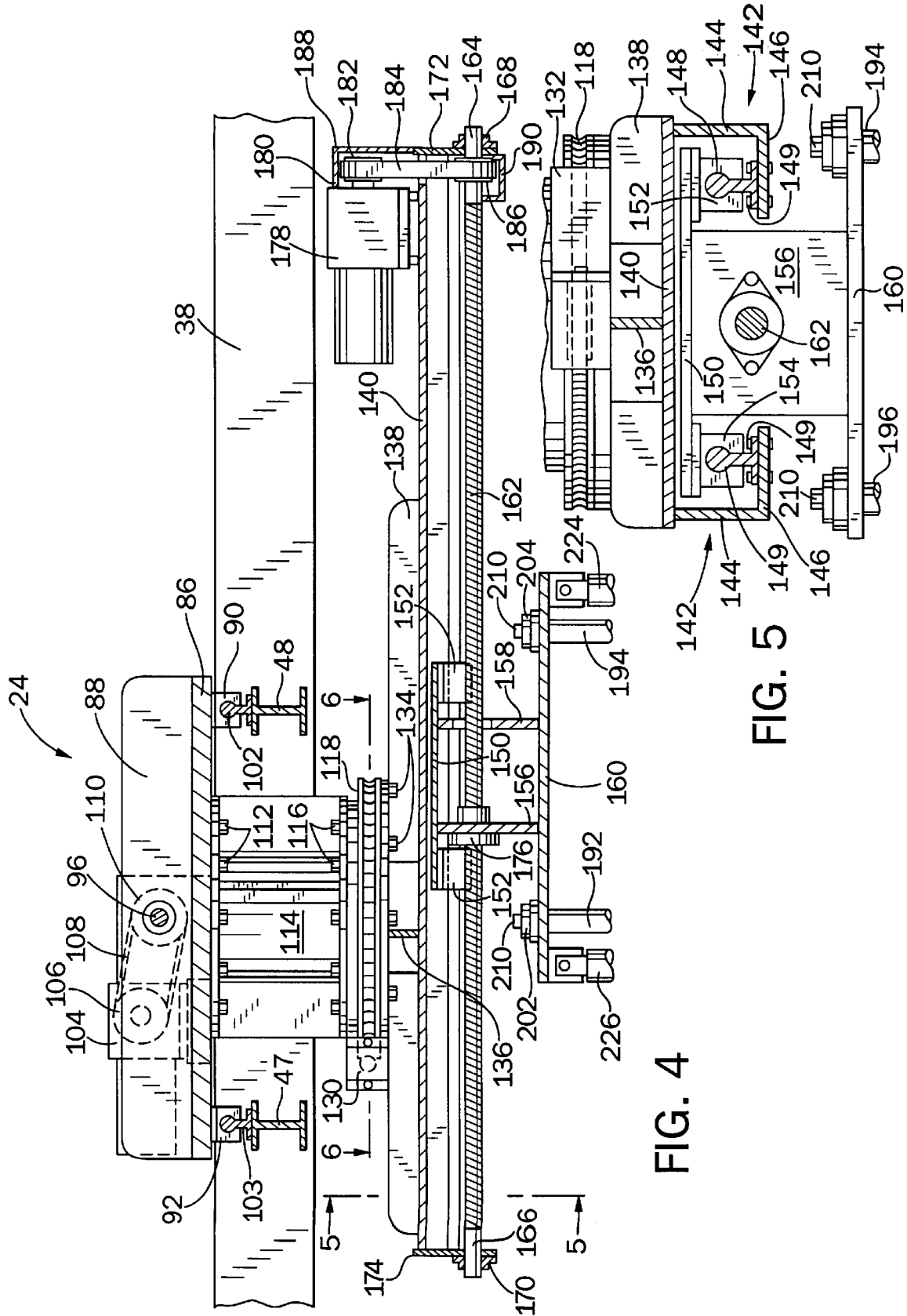

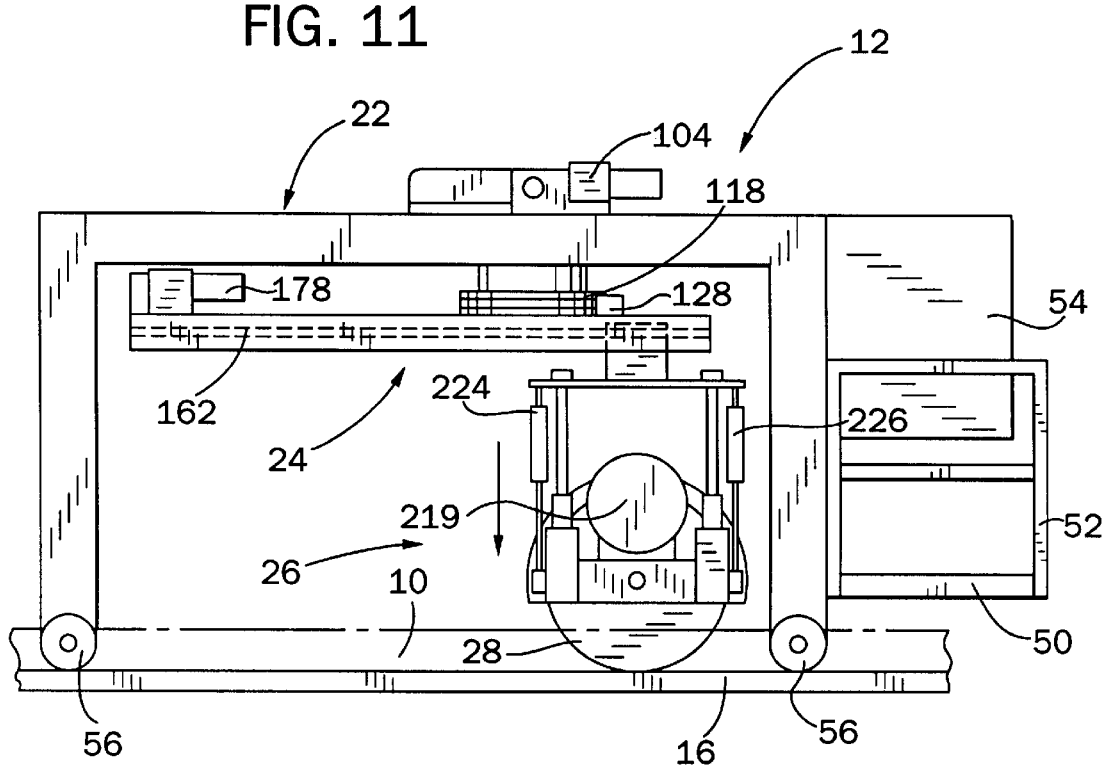

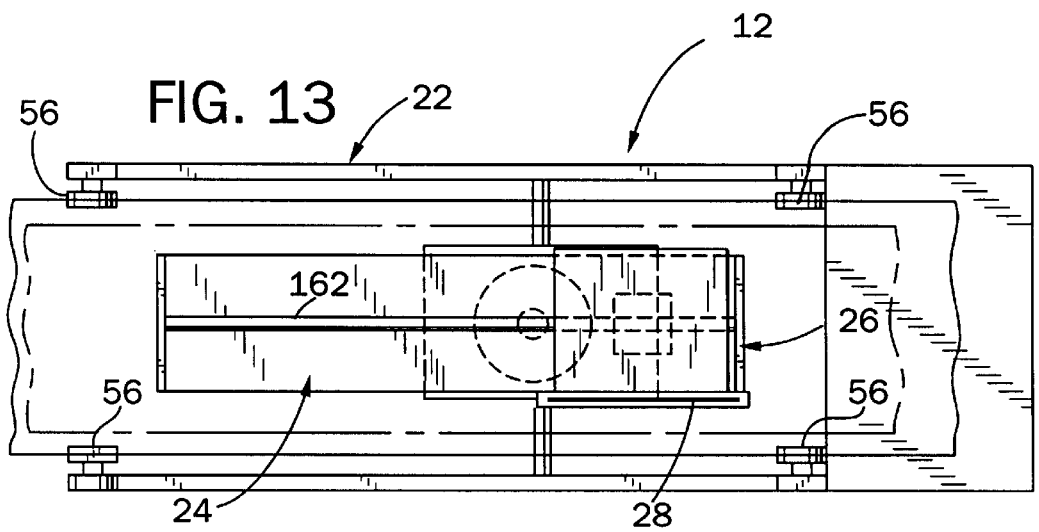
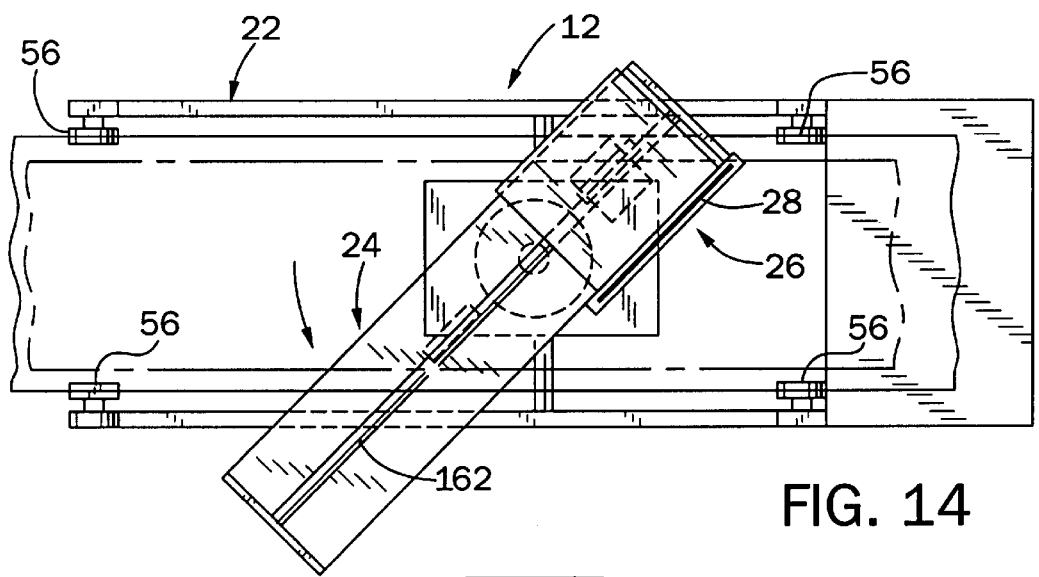
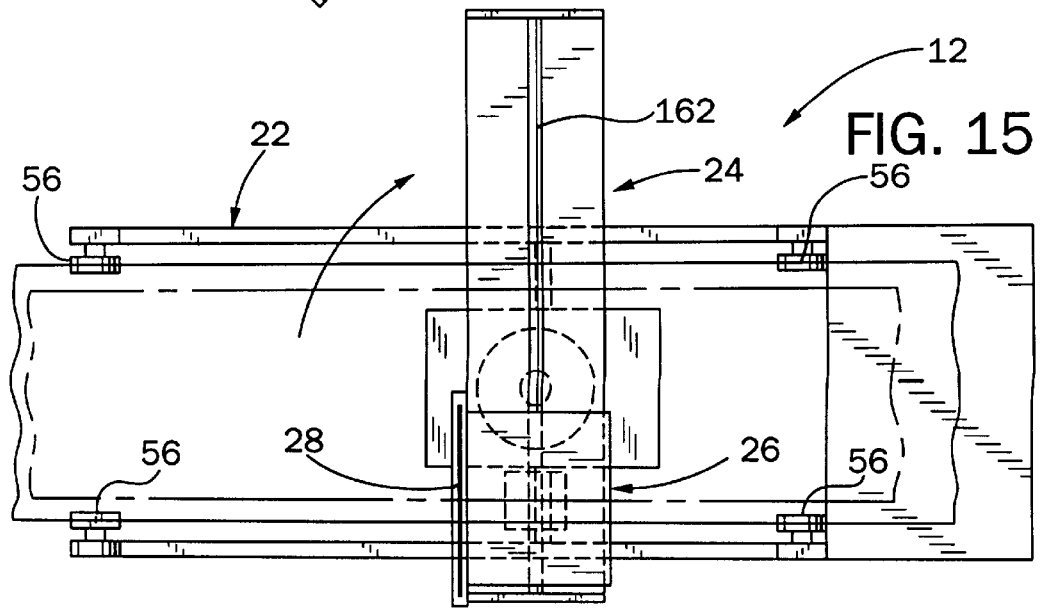

MULTI-DIRECTIONAL, SELF-PROPELLED SAW FOR CUTTING CONCRETE SLABS

BACKGROUND OF THE INVENTION

This invention relates broadly to concrete cutting apparatus and, more particularly, pertains to a multi-directional, carriage-mounted saw for cutting extruded, prestressed concrete slabs.

Concrete slabs are formed on casting beds by extruding machines of the type wherein a frame is mounted on a pair of rails between which a pallet extends. A hopper is mounted on the frame and feeds concrete or the like downwardly to a set of augers which are rotated by a source of power. These augers pick up the concrete and compress it within a packing chamber to form a slab with long bores therethrough formed by the augers. The compression of the concrete drives the machine forwardly on the rails with the slab being extruded therebehind.

Conventional extruding machines are of sufficient dimensions to form slabs in long lengths of 400–600 feet, with widths of 4–8 feet and thicknesses of 4–20 inches. Because of their immense mass, these slabs must be cut to a more reasonable size before they can be used in the construction of buildings. Traditionally, construction workers will use various sawing apparatus to make a longitudinal cut or a 90° cross-cut in order to obtain a workable piece of material. After the sawed piece is lifted from the casting bed, such as by a crane or the like, and transported to a remote building site, a road saw or chain saw is typically used to perform additional cutting or trimming often along an angular orientation to meet the specifications of the building architect.

Efforts to produce concrete slabs in the manner described above create problems in wasted concrete and additional handling of severed concrete slabs. Saws used at the building site must be blocked and braced to make additional cuts, and additional lifting equipment and manpower must be made available, both of which contribute to undesirably high labor and production costs. As more architects design buildings exhibiting predominantly angular features, it is desirable to offer a concrete saw which is able to improve upon the initial cutting operation and reduce the amount of expenditures currently incurred in the formation of concrete building material.

The prior art provides other types of saws that could be used for cutting extruded concrete slabs but they present some distinct disadvantages. For instance, U.S. Pat. No. 4,576,076 issued Mar. 18, 1976 to Pyle discloses a saw which is able to make longitudinal cross-cut and angular cuts using a blade which can be moved in various motions relative to the workpiece on a horizontal table. Such table saws are generally not suitable for cutting concrete slabs because they have a much different mounting and carriage that requires the workpiece to be moved by hand along the table while the saw is manipulated using a series of manual adjustments.

The prior art does provide at least one self-propelled, rail-mounted saw for cutting hollow, prestressed slabs along straight and angular paths. An example of such saw is the EL-1100 Hollow Core Slab Saw. This saw relies upon sophisticated electronic control to move a cutting blade and supporting framework along travel and cutting axes simultaneously. Unfortunately, this slab saw is unduly complicated and extremely expensive for the majority of customers.

Accordingly, there remains a need for an affordable, reliable and simplified concrete slab saw which travels along and selectively cuts an extruded slab longitudinally, laterally and angularly at a casting site on the same casting bed on which the extruder has traveled.

BRIEF SUMMARY OF THE INVENTION

The present invention advantageously provides a self-propelled, rail-mounted saw for cutting prestressed, hollow-core extruded concrete slabs along diverse paths in a manner which more efficiently readies the severed concrete material for building application.

In one aspect of the invention, a saw for cutting an extruded, prestressed concrete slab having a length, a width and a thickness includes a framework assembly movable along the length of the concrete slab. A carriage system is rotatably supported from the framework assembly about a first vertical axis perpendicular to the concrete slab and slidably mounted to the framework assembly for movement back and forth across the width of the concrete slab. A cutting arrangement including a rotary cutter is suspended from the carriage system over the concrete slab and is movable up and down along the second vertical axis substantially parallel to the first vertical axis. The cutting arrangement is also slidable along the carriage system. The framework assembly is an inverted U-shaped structure supporting a first feed screw thereon. The carriage system includes a slide plate having a flange nut threadably receiving the first feed screw, and a first set of slide brackets. The carriage system further includes a set of slide tracks connected with the framework assembly and cooperable with the first set of slide brackets. A photo optic arrangement is mounted on the framework assembly, and a sensor arm is mounted on the cutting arrangement and is operable with the photo optic arrangement to control operation of the rotary cutter. A turret is mounted on the slide plate and a slewing ring is connected between the turret and the cutting arrangement. The carriage system further includes a carriage housing supporting a second set of slide tracks. The cutting arrangement includes a second set of slide brackets cooperable with the second set of slide tracks. The cutting arrangement also includes a second flange nut cooperable with the second feed screw. The cutting arrangement also includes a motor mounting pedestal mounting a motor for the rotary cutter and a set of hydraulic cylinders for raising the motor mounting pedestal up and down. The cutting arrangement also includes a set of vertical guide rods for supporting the motor mounting pedestal.

In another aspect of the invention, a saw for cutting an extruded, prestressed concrete slab having a length, a width and a thickness includes a mobile framework assembly movable along the length of the concrete slab. A first motive system is provided for moving the framework assembly along the concrete slab. A carriage system is rotatably supported from the framework assembly about a first vertical axis substantially perpendicular to the concrete slab and slidably mounted on the framework assembly for movement back and forth across the width of the concrete slab. A second motive system is mounted on the framework assembly for rotating the carriage system relative to the framework assembly. A cutting arrangement including a powered rotary cutter is suspended from the carriage system over the concrete slab. The cutting arrangement is slidable along a longitudinal axis of the carriage system and is movable up and down between the carriage system and the concrete slab along a second vertical axis substantially parallel to the first vertical axis. A third motive system is mounted in the carriage system for moving the cutting arrangement along a longitudinal axis of the carriage system. A fourth motive system is mounted on the framework assembly for moving the carriage system and the cutting arrangement back and forth across the width of the concrete slab. A fifth motive system is provided for mounting the cutting arrangement up and down along the second vertical axis. A sixth motive system is provided for rotating the rotary cutter. The cutter is constructed and arranged to make longitudinal, lateral and angular cuts in a top surface and through the thickness of the concrete slab.

In yet another aspect of the invention, there is contemplated a self-propelled concrete saw movable along a prestressed concrete slab and having a framework assembly, a carriage system movably supported from the framework assembly and a cutting arrangement movably suspended from the carriage system for cutting the concrete slab along diverse paths. The improvement resides in the framework assembly being movable along the length of the concrete slab independently of any movement of the carriage system and the cutting arrangement. It is important to note that concrete saw conveniently moves along the same casting bed traveled by the extruder.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 4 is a sectional view taken on line 4—4 of FIG. 2;

FIG. 5 is a sectional view taken on line 5—5 of FIG. 4;

FIG. 11 is a representation similar to FIG. 8, but showing the concrete saw blade cutting downwardly through the thickness of the concrete slab;

FIG. 12 is a representation similar to FIG. 11, but showing the concrete saw blade making a longitudinal cut in the direction of the arrow;

FIG. 13 is a top diagrammatic view of the concrete saw as it makes a longitudinal cut relative to a concrete slab;

FIG. 14 is a top diagrammatical view of the concrete saw as it makes an angular cut relative to a concrete slab; and FIG. 15 is a top diagrammatical view of the concrete saw as it makes a cross-cut relative to a concrete slab.

DETAILED DESCRIPTION OF THE INVENTION

Figure 1:
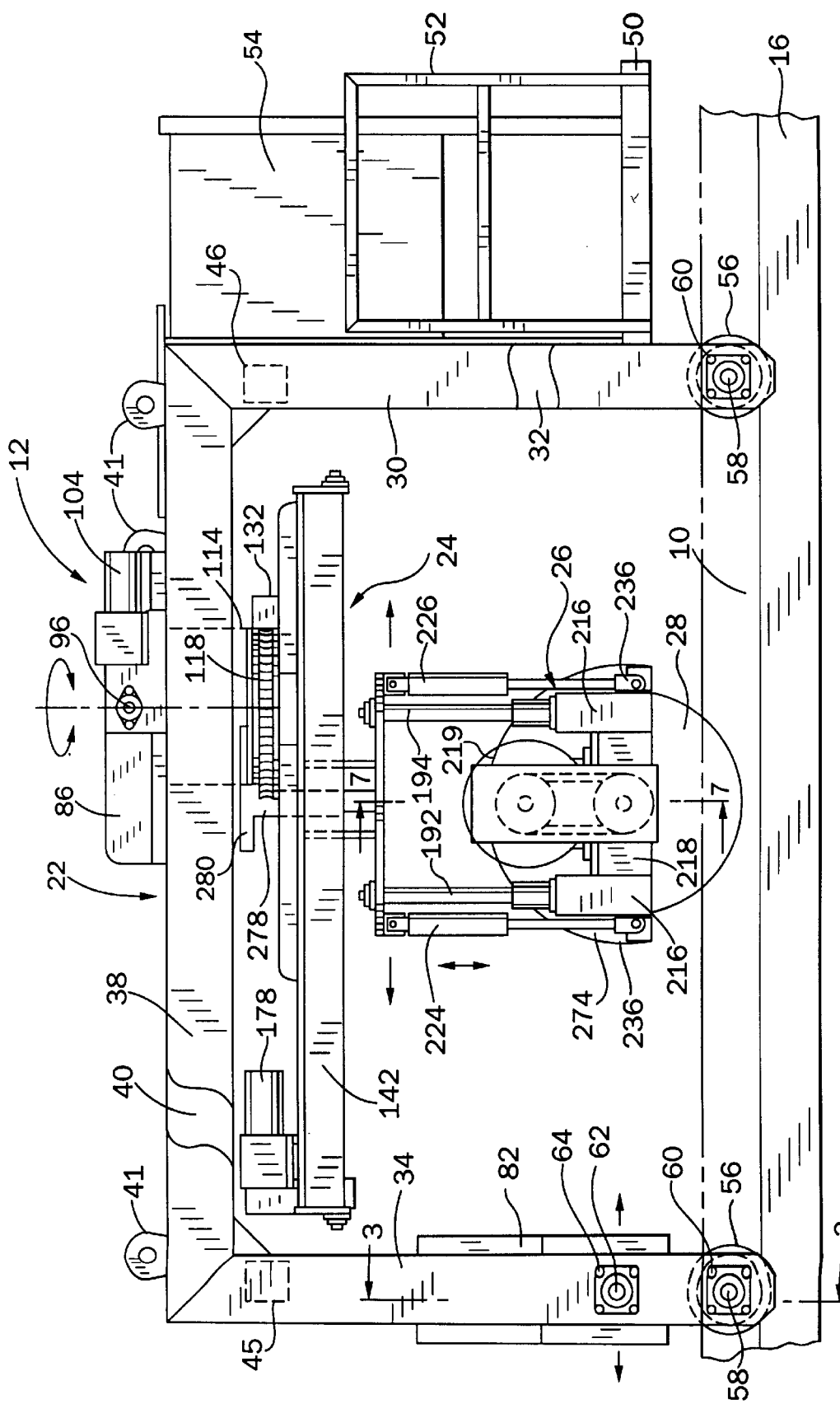
FIG. 1 is a side view of the concrete saw embodying the present invention.

Referring now in detail to the drawings, a concrete saw for cutting a prestressed, hollow core concrete slab 10 along different paths is generally identified by the reference numeral 12. As is well known, a traveling extruder machine (not shown) is used to extrude the concrete slab 10 on a casting bed 14 having spaced, parallel side rails 16, 18 spanned by a raised horizontal support surface 20. Such concrete slab 10 being generally 400–600 feet long, 4–8 feet in width, and 4–20 inches in thickness must be cut into more reasonably sized concrete sections before it can be used in building construction. As will be appreciated hereafter, the concrete saw 12 embodying the present invention replaces the extruder once the concrete has been cured, and traverses the length of the concrete slab to efficiently and accurately sever the slab performing longitudinal, lateral and angular cuts.

The concrete saw 12 is comprised mainly of three major components, namely a mobile framework assembly 22, a carriage system 24 and a cutting arrangement 26 including a rotary powered cutter 28.

Figure 2:
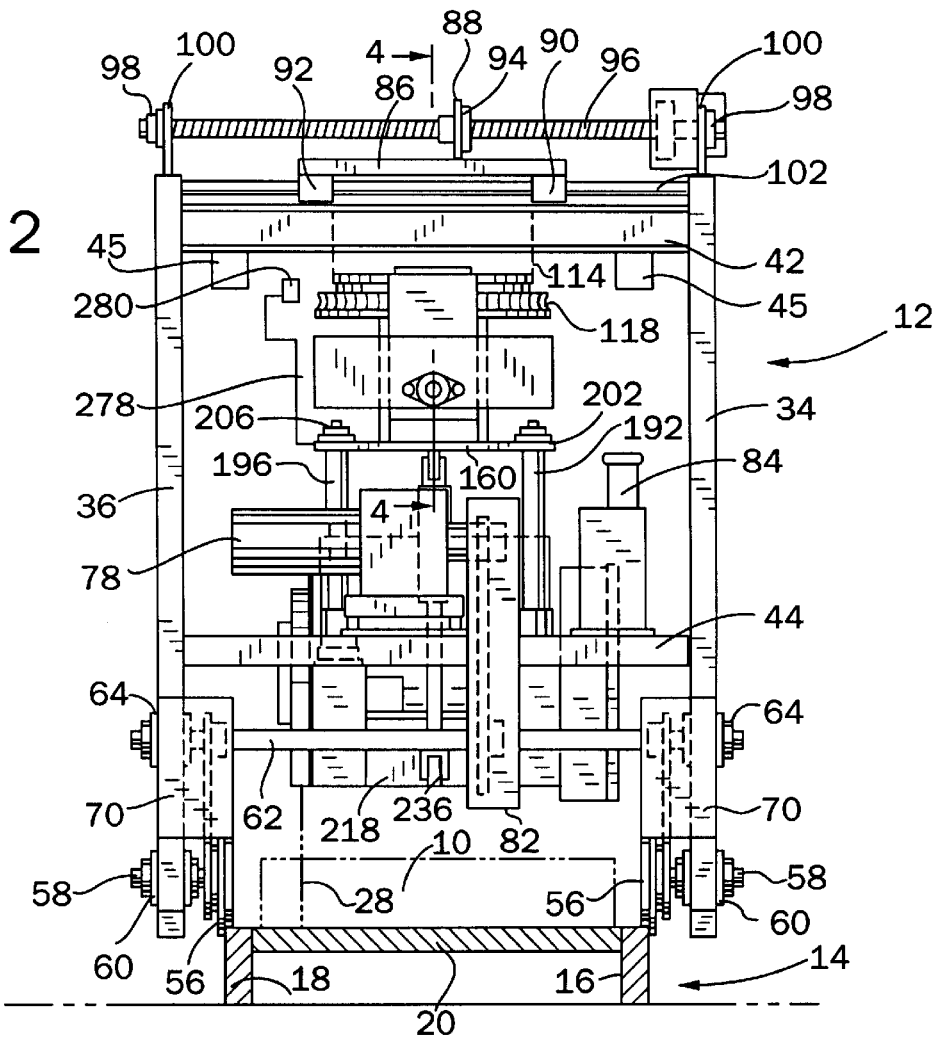
FIG. 2 is an end view taken from the left hand side of FIG. 1.
Figure 3:
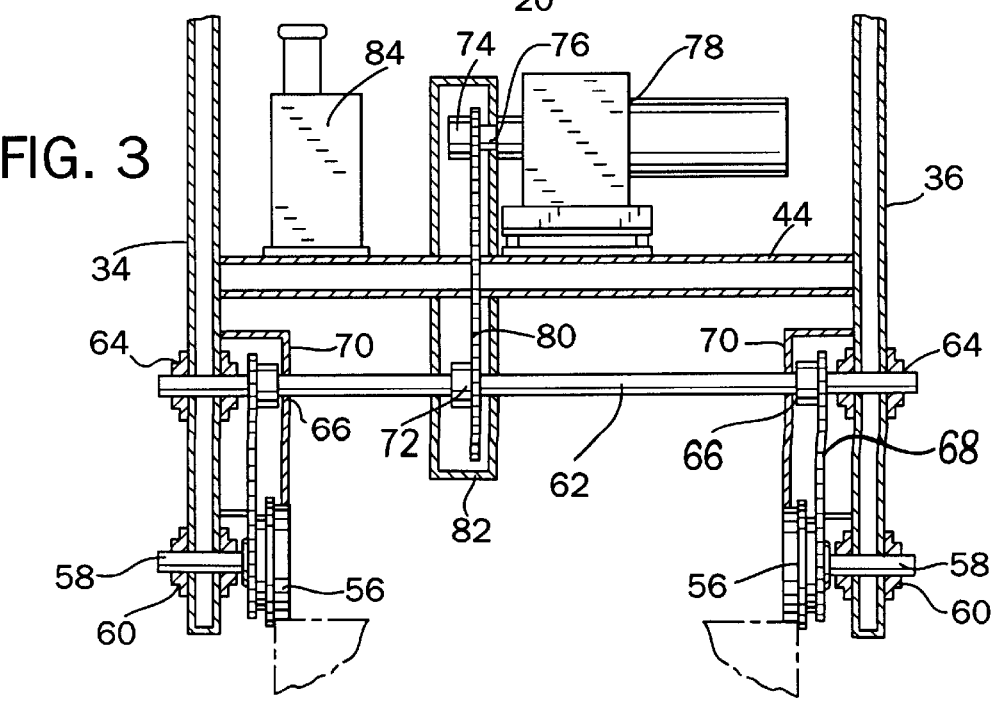
FIG. 3 is a sectional view taken on line 3—3 of FIG. 1.

As seen in FIGS. 1–3, mobile framework assembly 22 is an inverted U-shaped structure including a pair of forwardly disposed vertical frame members 30, 32, and a pair of rearwardly disposed vertical frame members 34, 36. Vertical frame members 30 and 34 are interconnected at their top ends by a first horizontal beam 38. Vertical frame members 32 and 36 are joined at their upper ends by a similar horizontal beam 40. The horizontal beams 38, 40 are provided with a series of lifting lugs 41 which are engageable with the hook of an overhead crane used to install and remove the concrete saw 12 on the casting bed rails 16, 18. FIG. 2 illustrates an upper cross member 42 and a lower cross member 44 used to join vertical frame members 34 and 36. A pair of photo optic transmitters 45 are suspended on cross member 42 and are used to limit the motion of the cutter 28 as will be understood later. Although not shown, it should be understood similar cross members connect the vertical frame members 30 and 32. A pair of reflectors (one of which is shown as 46 in phantom in FIG. 1) are generally aligned with photo optic transmitters 45 and reflect a light beam back to the transmitters 45. The framework assembly also includes a pair of parallel I-beams 47, 48 (FIG. 4) which extend across and interconnect the horizontal beams 38 and 40. Extending forwardly from the vertical frame members 30, 32 is a horizontal platform 50 supporting a handrail structure 52 and a control cabinet 54. Together, the platform 50, handrails 52 and control cabinet 54 define a station at which a saw operator may actuate the controls of the concrete saw 12 and observe the operation thereof, such as through a transparent window extending between the vertical frame members 30, 32.

In order to move the concrete saw along the length of the slab 10, the bottom end of each vertical frame member 30, 32, 34 and 36 is provided with a drive wheel-sprocket unit 56 having a stub shaft 58 which is rotatably mounted by a bearing 60. Above the drive wheel-sprocket unit 56 on vertical frame members 34, 36 is a framework drive shaft 62 having opposite having opposite ends which are supported for rotation in bearings 64 further journaled in the vertical frame members 34, 36. Drive shaft 62 includes a pair of end sprockets 66 which cooperate with the sprocket portions of the rearwardly disposed drive wheel-sprocket units 56 such that a drive chain 68 entrained around each set of sprockets 56, 66 will translate rotation of drive shaft 62 into corresponding rotation of the drive wheel portions of units 56. Suitable guards 70 are placed around portions of the bearings 64, sprocket 66 and chains 68 to prevent contact with these moving parts. Drive shaft 62 also includes an intermediate sprocket 72 which cooperates with a drive sprocket 74 of a rotatable output shaft 76 of a gear motor 78 mounted upon the cross member 44 and controlled from the operator station. A drive chain 80 is wrappingly engaged around the sprockets 72, 74, and a suitable guard 82 protectively shields the sprockets 72, 74, the output shaft 76 and the chain 80. A hydraulic power pack 84 is also secured to the cross member 44 between vertical frame member 34 and guard 82. As will be appreciated hereafter, the hydraulic power pack 84 is used to supply hydraulic power on the saw 12 to other hydraulic motors to be described. With the construction set forth above, actuation of the gear motor 78 will turn the output shaft 76 and sprocket 74 which, in turn, will rotate the sprocket 72 and drive shaft 62. This causes rotation of sprockets 66 and drive sprocket-wheel units 56 provided on vertical frame members 34, 36 so that the framework assembly 22 is propelled along the rails 16, 18. Drive wheel-sprocket units 56 on the forwardly disposed frame members 30, 32 are not driven and function as idler wheels.

Referring to FIGS. 2 and 4, an upper end of the carriage system 24 includes a slide plate 86 having a vertical wall 88 and two pair of depending keyhole-shaped, slide brackets 90, 92. Vertical wall 88 acts as a connecting surface for a flange nut 94 which threadingly receives a first horizontal feed screw 96 having end portions disposed for rotation by bearings 98 in front and rear mounting plates 100 extending upwardly from the top of vertical frame members 34, 36. Brackets 90, 92 are slidably and matingly engaged along a first pair of keyhole-shaped, parallel slide tracks 102, 103 disposed on top of the I-beams 47, 48 between the vertical frame members 34, 36. Mounted above the horizontal beam 38 is a gear motor 104 having a rotatable output shaft sprocket 106 which is entrained by a timing belt 108 with a driven sprocket 110 on feed screw 96. Actuation of motor 104 will turn feed screw 96 relative to flange nut 94 such that slide plate 86 will slide back and forth across the slide tracks 102, 103 to provide travel across the width of the concrete slab 10.

Figure 6:
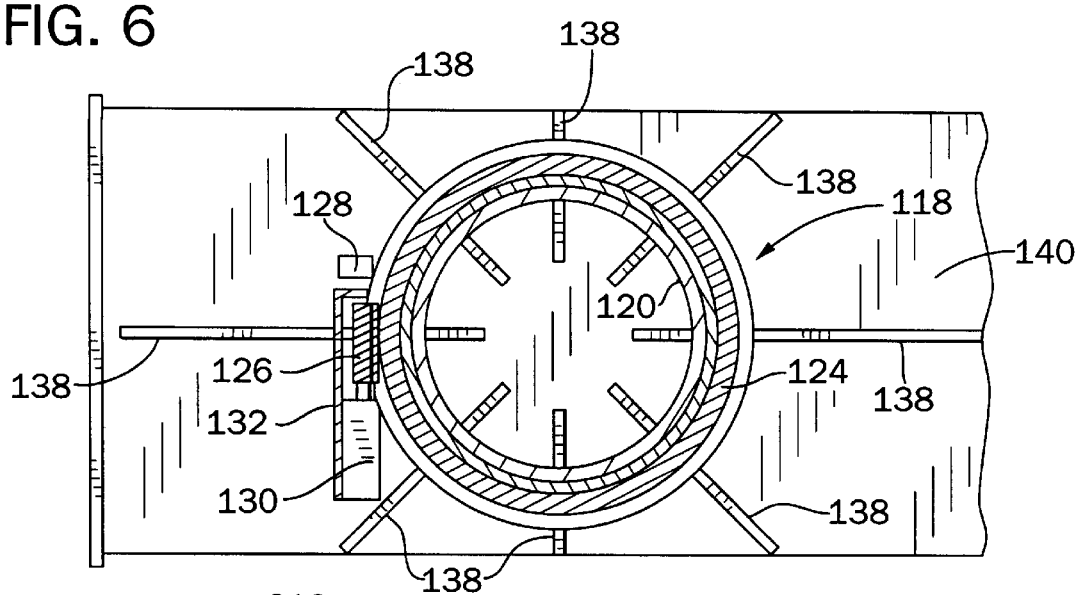
FIG. 6 is a sectional view taken on line 6—6 of FIG. 4.

Connected to the bottom of side plate 86 by a series of bolts 112 is an upper end of a generally cylindrical turret 114. The lower end of turret 114 is connected by another series of bolts 116 to a slewing ring 118 which provides the rotation of the carriage system 24 and cutting arrangement 26. As best depicted in FIG. 6, the slewing ring 118 includes an inner ring 120 fixed to the turret 114. An outer ring 124 rotates relative to the inner ring 120, and the outer ring 124 is meshingly engaged with a spiral worm gear 126 driven by a hydraulic motor 128. The spiral worm gear 126 forms part of an encoder 130 having a housing 132 which is anchored to the turret 114. The encoder is used to translate rotary motion to an electrical signal. This signal outputs to a digital read out on the control cabinet 54 indicating the number of degrees of rotation imparted from the carriage system 24 and the cutting arrangement 26 relative to the framework assembly 22. As best seen in FIGS. 4 and 5, the slewing ring 118 is fastened by a series of bolts 134 to a flange-like collar 136 having a set of radially extending upstanding ribs 138 which are integrally joined to a top housing plate 140. Each of a pair of L-shaped carriage housing sections 142 is comprised of a vertical wall 144 depending downwardly from a top housing plate 140, and a horizontal wall 146 extending inwardly from the bottom of vertical wall 144. Walls 146 serve as mounting surfaces to which a second pair of keyhole-shaped, parallel slide tracks 148, 149 are mounted such as by fasteners 149.

In order to slide the cutting arrangement 26 along the carriage system 24 as depicted in FIGS. 4 and 5, the cutting arrangement 26 has a top support plate 150 spaced beneath and positioned substantially parallel to the top housing plate 140. Depending downwardly from one end of the support plate 150 is a second pair of keyhole-shaped slide brackets 152, 154 which are matingly engageable with the tracks 148, 149. A pair of parallel hanger plates 156, 158 are joined generally perpendicularly at their upper ends to support plate 150, and are similarly joined at their bottom ends to a horizontal motor mount plate 160. The hanger plates 156, 158 are provided with aligned openings through which a second horizontal feed screw 162 is passed. The ends of feed screw 162 have smooth stub shafts 164, 166 which are mounted by bearings 168, 170 in a pair of carriage housing end plates 172, 174. A flange nut 176 is secured to hanger plates 156 and is threadingly driven by feed screw 162 which is driven by a gear motor 178 secured on one end of the top housing plate 140. Motor 178 has a rotatable output shaft 180 provided with a drive sprocket 182 which is connected by a drive belt 184 to a driven sprocket 186 on screw stub shaft 164. Suitable guards 188, 190 are provided around sprockets 182, 186 and belt 184 to prevent contact with these moving parts. Actuation of motor 178 will turn feed screw 162 relative to flange nut 176 such that motor mount plate 160 and the attached cutting arrangement 26 will slide back and forth along slide tracks 148, 149 of carriage system 24.

Figure 7:
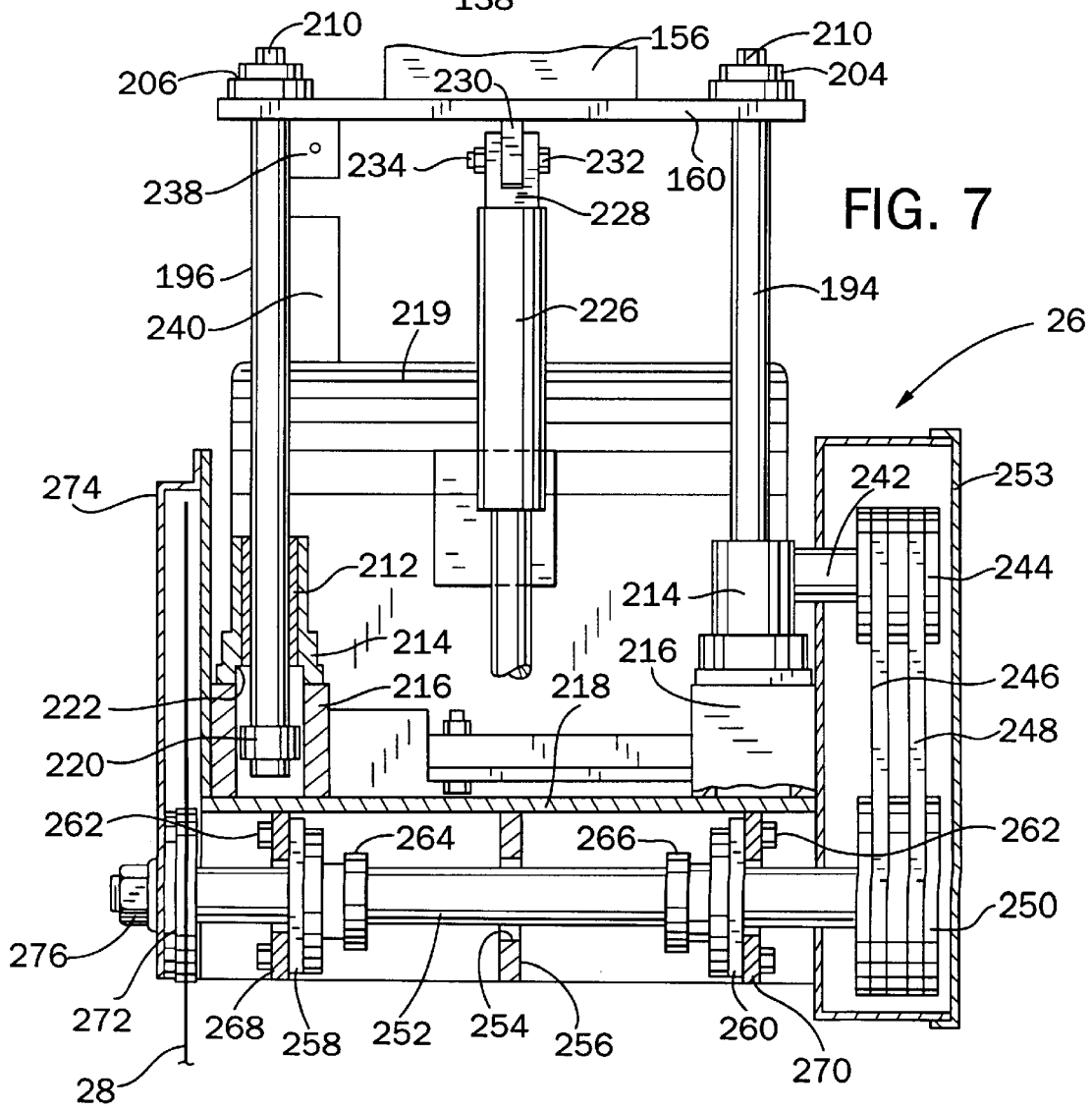
FIG. 7 is a sectional view taken on line 7—7 of FIG. 1.

FIGS. 4 and 7 illustrate a set of four parallel, vertical guide rods 192, 194, 196, 198 which pass through the motor mount plate 160 and are suspended at their top ends by stepped washers 202, 204, 206, 208 and fasteners 210. Each of the guide rods 192, 194, 196, 198 passes through a bushing 212 mounted on the inside of a stepped tubular linear guide 214. The guides 214 each sit on an upright square tube 216 mounted at each corner of a motor mount pedestal 218 which typically carries an electrically powered, 60 horsepower motor 219 used to drive rotary cutter 28. Each lower end of the guide rod 192, 194, 196, 198 carries a set collar 220 which is engageable with a shoulder 222 and its linear guide 214 as the motor mount pedestal 218 is raised and lowered by a pair of hydraulic cylinders 224, 226. Each of the cylinders 224, 226 has a cylinder end clevis 228 fixed to a lug 230 depending from motor mount plate 160 by a bolt 232 and nut 234. A rod end clevis 236 is attached to the bottom of motor mount pedestal 218, as seen in FIGS. 1 and 2. A proximity switch 238 is attached to the underside of motor mount plate 160 and is engageable with the top of a sensor arm 240 extending upwardly from electric motor 219. Actuating the cylinders 224, 226 to extend their rods will lower the motor mount pedestal 218 and electric motor 219 on guide rods 192, 194, 196, 198 until each collar 220 engages shoulder 222. Retracting the rods of the cylinders 224, 226 will raise the motor mount pedestal 218 and motor 219 until sensor arm 240 contacts priority switch 238.

Electric motor 219 has a rotatable output shaft 242 provided with a sheave 244 which is entrained by a pair of V-belts 246, 248 to a cooperating sheave 250 mounted on a rotary cutter drive shaft 252. A suitable guard 253 surrounds sheaves 244, 250, V-belts 246, 248 and shafts 242, 252 to prevent contact with these moving parts. The drive shaft 252 passes through an opening 254 in a motor pedestal plate 256, and is supported by bearings 258, 260 attached such as by fasteners 262 to collars 264, 266 and pedestal support 268, 270. At the end of drive shaft 252 opposite sheave 250 is the rotary blade or cutter 28 which is held in place by a retainer 272. A semi-circular blade guard 274 (FIG. 1) which surrounds the upper half of cutter 28 is held in place against pedestal 218 by nut 276. Actuation of blade motor 219 will rotate sheave 244, belts 246, 248, and sheave 250 so as to provide rotation to blade drive shaft 252 and rotary cutter 28 which is operated to sever the concrete slab 10. As seen in FIGS. 1 and 2, an angulated photo optic sensor arm 278 having a sensor flag 280 is secured to the motor mount plate 160. The flag 280 is positioned at a location generally aligned with cutter 28. Whenever the flag interrupts the light beam between the transmitters 45 and the reflectors 46, power to the engine 219 will be terminated and the rotary cutter 28 will stop.

Although not illustrated, it should be understood that the cutting arrangement 26 is equipped with a conventional water flushing system which cools the cutter 28 and dampens the concrete dust generated in the sawing operation. Such flushing system usually includes a water reservoir mounted on the framework assembly 22 as well as a rotating reel carrying water (and electrical) lines for the saw 12.

Figure 8:
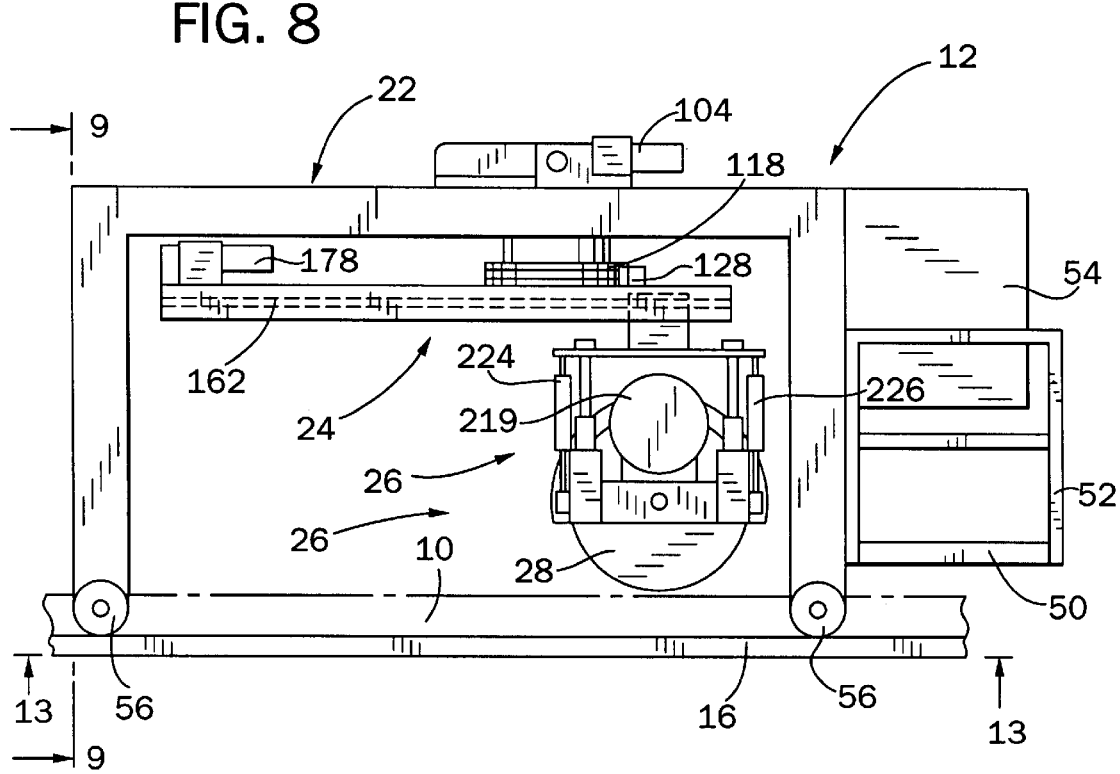
FIG. 8 is a representation of the concrete saw with its blade shown raised above the surface of a concrete slab at the beginning of a cutting operation.
Figure 9:
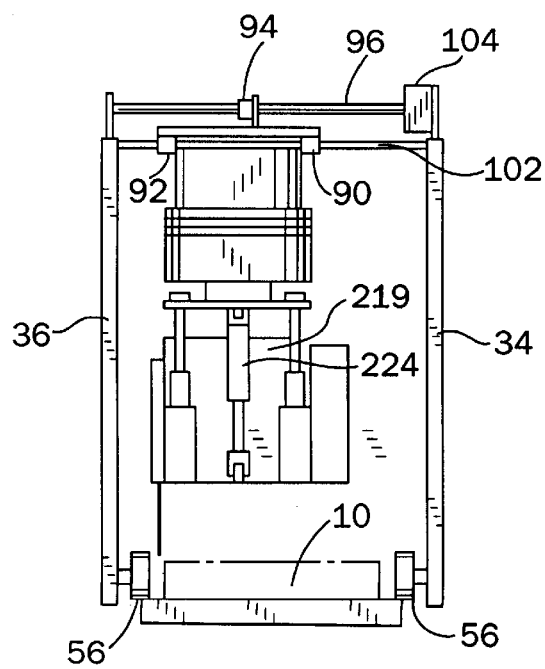
FIG. 9 is an end view taken on line 9—9 of FIG. 8.
Figure 10:
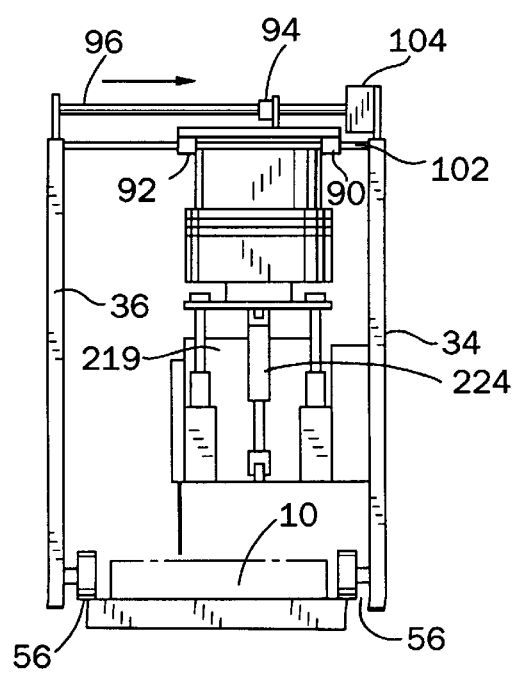
FIG. 10 is an end view similar to FIG. 9, but showing the movement of the concrete saw blade as it is moved across the width of a concrete slab.

With reference now to FIGS. 8 and 13, the concrete saw 12 is lifted in place such as by an overhead crane, so that the drive wheel-sprocket units 56 are properly engaged on rails 16, 18. It should be understood throughout the ensuing description that the concrete saw 12 rides on the same rails 16, 18 of the casting bed 14 as the extruder which has proceeded it. The operator positioned at the control cabinet 54, first using gear motor 78, moves the framework assembly 22 along the length of the concrete slab 10 keeping the carriage system 24 still and the cutting arrangement 26 raised above the surface of the slab 10. In its initial position, the rotational axis of the cutter 28 is generally transverse to the longitudinal axis of the slab 10. Once in the general cutting location, the operator then shifts the carriage system 24 and cutting arrangement 26 back and forth (FIGS. 9 and 10) across the width of the slab 10 using the gear motor 104 thereby arriving at a location where a longitudinal or "riff" cut is desired. As shown in FIG. 11, the operator then actuates the hydraulic cylinders 224, 226 and electric motor 219 so that cutting arrangement 26 will move downwardly and cutter 28 will penetrate the concrete to a predetermined cutting depth. Once this cutting depth is reached, the operator moves the cutting arrangement 26 and cutter 28 rearwardly on the carriage system 24 using electric motor 178 as illustrated in FIG. 12.

Besides being able to make longitudinal cuts, the saw 12 is able to effectively negotiate angular cuts as represented in FIG. 14 and cross-cuts or "notches" as depicted in FIG. 15. When moving from the position of FIG. 13 to the position of FIG. 14, the operator swings the entire carriage system 24 and cutting arrangement 26 using slewing ring 118, hydraulic motor 128 and encoder 130. In moving from the position of FIG. 14 to the position of FIG. 15, the operator swings the carriage system 24 and cutting arrangement 26 so that the axis of feed screw 162 is generally perpendicular to the longitudinal axis of the slab 10. Rotation of cutter 28 in FIGS. 14 and 15 is further controlled by the photo optic transmitters 45, reflectors 46 and the sensor flag 280 as explained above.

It is noteworthy to distinguish the concrete saw 12 of the present invention from the self-propelled, prior art saw which performs its cutting motions as the framework assembly is simultaneously moved along the slab. Instead of the complicated and expensive controls required by this machine, the present concrete saw carries out its positioning and cutting along one single axis at a time. Rather than coordinating the movements of rack and pinion arrangements like the prior art, the present concrete saw 12 utilizes independent feed screws in order to provide longitudinal and lateral movement of the cutting arrangement 26. It should be appreciated that the concrete saw 12 is able to perform longitudinal, lateral and angular cuts in a manner which is affordable, reliable and simplified.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with following claims.

I claim:

1. In a self-propelled concrete saw movable along a prestressed concrete slab having a top surface lying in a substantially horizontal plane and having a framework assembly, a carriage system movably supported from the framework assembly and a cutting arrangement movably suspended from the carriage system for cutting the concrete slab along diverse paths, the improvement wherein:

the framework assembly is movable along the length and the top surface of the concrete slab while the carriage system and/or the cutting arrangement remain fixed.

2. The improvement of claim 1, wherein the cutting arrangement is movable longitudinally, laterally and angularly with respect to the top surface of the concrete slab.

3. A saw for cutting an extruded, prestressed concrete slab having a length, a width, a thickness and a top surface lying in a substantially horizontal plane, the saw comprising:

a framework assembly movable solely along the length of the concrete slab;

a carriage system rotatably supported from the framework assembly about a first vertical axis perpendicular to the top surface of the concrete slab and slidably mounted on the framework assembly for movement back and forth across the width and the top surface of the concrete slab; and a cutting arrangement including a rotary cutter suspended from the carriage system over the concrete slab and movable up and down along a second vertical axis substantially parallel to the first vertical axis, the cutting arrangement also being slidable along the carriage system.

4. The saw of claim 3, wherein the framework assembly is an inverted U-shaped structure supporting a first feed screw thereon.

5. The saw of claim 4, wherein the carriage system includes a slide plate having a first flange nut threadably receiving the first feed screw, and a first set of slide brackets.

6. The saw of claim 5, wherein the carriage system further includes a first set of slide tracks connected with the framework assembly and cooperable with the first set of slide brackets.

7. The saw of claim 5, including a turret mounted to the slide plate.

8. The saw of claim 7, including a slewing ring connected between the turret and the cutting arrangement.

9. The saw of claim 3, including a photo optic arrangement mounted on the framework assembly.

10. The saw of claim 9, including a sensor arm mounted on the cutting arrangement and operable with the photo optic arrangement to control operation of the rotary cutter.

11. The saw of claim 3, wherein the carriage system further includes a carriage housing supporting a second set of slide tracks.

12. The saw of claim 11, wherein the cutting arrangement includes a second set of slide brackets cooperable with the second set of slide tracks.

13. The saw of claim 5, wherein the cutting arrangement supports a second feed screw.

14. The saw of claim 13, wherein the cutting arrangement includes a second flange nut cooperable with the second feed screw.

15. The saw of claim 3, wherein the cutting arrangement includes a motor mounting pedestal mounting a motor for the rotary cutter.

16. The saw of claim 15, wherein the cutting arrangement includes a set of hydraulic cylinders for raising the motor mounting pedestal up and down.

17. The saw of claim 15, wherein the cutting arrangement includes a set of vertical guide rods for supporting the motor mounting pedestal.

18. A saw for cutting an extruded, prestressed concrete slab having a length, a width, a thickness, and a top surface lying in a substantially horizontal plane, the saw comprising:

a movable framework assembly movable along the length of the concrete slab;

a first motive system for moving the framework assembly along the concrete slab;

a carriage system rotatably supported from the framework assembly about a first vertical axis substantially perpendicular to the top surface of the concrete slab and slidably mounted on the framework assembly for movement back and forth across the width and the top surface of the concrete slab;

a second motive system mounted on the framework assembly for rotating a carriage relative to the framework assembly;

a cutting arrangement including a powered rotary cutter suspended from the carriage system over the concrete slab, the cutting arrangement being slidable about a longitudinal axis of the carriage and movable up and down between the carriage system and the concrete slab along a second vertical axis substantially parallel to the first vertical axis;

a third motive system mounted on the carriage system for moving the cutting arrangement along a longitudinal axis of the carriage system;

a fourth motive system mounted on the framework assembly for moving the carriage system and the cutting arrangement back and forth across the width and the top surface of the concrete slab;

a fifth motive system for moving the cutting arrangement up and down along the second vertical axis; and a sixth motive system for rotating the rotary cutter, wherein the cutter is constructed and arranged to make longitudinal, lateral and angular cuts in the top surface and through the thickness of the concrete slab.

19. The saw of claim 18, wherein the first, third, fourth and sixth motive systems each include an electric motor.

20. The saw of claim 18, wherein the second and fifth motive devices are hydraulic motors.

* * * * *